United States Patent [19]

Johnson, Jr. et al.

[11] Patent Number: 4,585,584

[45] Date of Patent: Apr. 29, 1986

[54] PROCESS FOR PREPARING ROSIN ESTERS OF IMPROVED COLOR

[75] Inventors: Robert W. Johnson, Jr., Savannah, Ga.; Roger Logan, New Foundland, N.J.

[73] Assignee: Union Camp Corporation, Wayne, N.J.

[21] Appl. No.: 721,304

[22] Filed: Apr. 8, 1985

[51] Int. Cl.$^4$ .......................... C09F 1/04; C09F 7/00; C08L 93/04

[52] U.S. Cl. .................................. 260/104; 260/97.5; 260/108

[58] Field of Search ....................... 260/104, 97.5, 108

[56] References Cited

U.S. PATENT DOCUMENTS

| | | |
|---|---|---|
| 2,239,555 | 4/1941 | Fleck et al. ........................ 260/106 |
| 2,241,341 | 5/1941 | Ender ................................ 260/104 |
| 2,306,455 | 12/1942 | Martin ............................. 260/104 |
| 2,369,125 | 2/1945 | Anderson ........................ 260/104 |
| 4,248,770 | 2/1981 | Matsuo et al. .................. 260/106 |
| 4,302,371 | 11/1981 | Matsuo et al. .................. 260/106 |
| 4,507,228 | 3/1985 | Duncan ........................... 260/97.6 |

OTHER PUBLICATIONS

Kirk-Othmer, Encyclopedia of Chemical Technology, 2nd Ed., Wiley, N.Y. (1968), vol. 17, pp. 475–508.

*Primary Examiner*—Herbert S. Cockeram
*Attorney, Agent, or Firm*—Kane, Dalsimer, Kane, Sullivan and Kurucz

[57] ABSTRACT

Tall oil rosin esters of pentaerythritol prepared in the presence of activated carbon possess an improved, lighter color.

5 Claims, No Drawings

PROCESS FOR PREPARING ROSIN ESTERS OF IMPROVED COLOR

BACKGROUND OF THE INVENTION

1. Field of the Invention

The invention relates to the esterification of rosin and in particular relates to the esterification of tall oil rosins with polyhydric alcohols.

2. Brief Description of the Prior Art

Tall oil rosin, obtained upon the distillation of tall oil or tall oil fractions, is esterified with pentaerythritol. The esters are useful as tackifiers in various adhesive formulations and also can be used as intermediates for a variety of valuable products including coating and ink resins. The esters prepared normally possess an objectionable dark color and a typical tall oil rosin odor.

The U.S. Pat. No. 3,780,013 describes a method of improving the color of the pentaerythritol esters of tall oil rosin by the incremental addition of a phenol sulfide to the esterification reaction mixture.

The U.S. Pat. No. 3,780,012 describes a process of improving the color of tall oil esters of pentaerythritol by pretreating the rosin with paraformaldehyde under certain conditions and distilling the treated rosin.

We have found that esters of tall oil rosin and pentaerythritol having an improved, lighter color can be obtained by carrying out the esterification in the presence of activated carbon. Unlike prior art processes such as described above, the decolorizing agent may easily be removed from the product by simple filtration. The process is economical and easy to carry out.

Activated carbon has long been known to remove color bodies and odor from organic material. The uniqueness of the present invention is the significant improvement observed when carbon is included during the reaction as opposed to carbon treatment of the rosin prior to esterification or post treatment.

SUMMARY OF THE INVENTION

The invention comprises in the esterification of tall oil rosin with pentaerythritol, the improvement, which comprises; carrying out the esterification in the presence of an activated carbon.

DETAILED DESCRIPTION OF THE PREFERRED EMBODIMENTS OF THE INVENTION

The rosin colors referred to herein are United States Dept. of Agriculture (USDA) standards varying from X, the lightest to D the darkest color. The color scale is designated by the symbols X, WW, WG, N, M, K, I, H, G, F and D. The tall oil rosin esters of pentaerythritol, in the absence of any special treatment typically have a color of H according to the scale.

The improvement of the present invention is applicable to improve any of the known esterifications of tall oil rosin with pentaerythritol (PE). In general, the esterification may be carried out by bringing the reactants together in stoichiometric proportions or slight excess of either rosin or PE and heating the mixture at a temperature of from about 200° C. to 300° C. for a period of from about 3 to about 10 hours. Advantageously an esterification catalyst is added during heating. Representative of known catalysts, employed in catalytic proportions, are calcium hydroxide, zinc oxide, phosphoric acid, p-toluene sulfonic acid, lithium carbonate and the like.

According to the invention, the above described esterification is improved by carrying it out in the presence of an activated carbon as opposed to pretreatment of rosin or posttreatment of ester. The activated carbon is added to the reaction mixture in a proportion of from about 0.1 to 5.0 percent by weight of the rosin reactant. Greater proportions may be used but does not have any advantage. Preferably from 0.5 to 1.0 percent by weight of rosin is employed. A very critical property with these resins is in adhesion where low odor is important. Unexpectedly the carbon used in the reaction not only reduces the color but nearly eliminates the objectionable tall oil odor.

Any of the commercially available activated carbons may be employed to carry out the invention. Preferred forms of activated carbon are those derived from peat, over those derived from wood or coal. Specific examples of preferred activated charcoals and those commercially available from American Norit Co., are FQA, PN-3, and AZO grades.

The following examples set forth the manner and the process of making and using the invention and set forth the best mode contemplated by the inventor for carrying out the invention but are not to be construed as limiting.

EXAMPLE 1

This Example is not an example of the invention, but is made for comparative purposes.

To a suitable reaction vessel equipped with a stirrer and thermometer was added 100 part of tall oil rosin having a color of WW. Then 11 parts of pentaerythritol and 0.1% $Li_2CO_3$ as a catalyst were added based on the weight of the rosin. The mixture was heated to 275° C. for about 8 hours. The resultant tall oil rosin PE ester was found to have a color of H as measured on the USDA rosin scale and an odor typical of tall oil rosin.

EXAMPLE 2

The procedure of Example 1 was followed except that activated carbon was added as follows: 100 part of tall oil rosin (color WW), 11 parts of pentaerythritol, 0.1% $Li_2CO_3$ as catalyst, and 1.0% Norit AZO grade activated carbon were charged to the reaction vessel. The mixture was heated to 275° C. for about 8 hours and then filtered. There was obtained a tall oil rosin PE ester having a WW rosin color and essentially no tall oil rosin odor. Identical results were obtained using Norit FQA and PN-3 carbon.

EXAMPLE 3

The procedure of Example 2 was followed except a lower amount of carbon was used. For example when 0.75% Norit FQA was used an ester having WG rosin color was obtained. When 0.50% Norit FQA was used an ester having a M-N rosin color was obtained.

Examples 1, 2 and 3 thus show the effect of the amount of carbon has on final color of the tall oil rosin PE ester.

EXAMPLE 4

This example illustrates the effect of pretreating the tall oil rosin with activated carbon prior to esterification with pentaerythritol.

The procedure of Example 1 was followed except the tall oil rosin was initially pretreated with 1% Norit FQA carbon at 250° C. for 1 hour. The treated tall oil rosin was next subjected to the pentaerythritol esterification reaction. The resultant ester had a rosin color of I.

EXAMPLE 5

This example illustrates the effect of post treating the tall oil rosin PE ester with activated carbon. The tall oil rosin PE ester from Example 1 having a color H was treated with 1% Norit AZO at 250° C. for 2 and for 6 hours. The resulting ester had an M-N and N rosin color, respectively.

What is claimed:

1. In the esterification of tall oil rosin with pentaerythritol, the improvement, which comprises; carrying out the esterification in the presence of an activated carbon.

2. The improved esterification of claim 1 carried out in the presence of a catalytic proportion of an esterification catalyst.

3. The improved esterification of claim 1 wherein the proportion of carbon is from about 0.1 to 5.0 percent by weight of rosin.

4. The improved esterification of claim 3 wherein the proportion is from about 0.5 to 1.0 percent by weight of rosin.

5. The improved esterification of claim 1 carried out at a temperature of from 200° C. to 300° C.

* * * * *